(12) United States Patent
Salah et al.

(10) Patent No.: US 11,006,442 B2
(45) Date of Patent: May 11, 2021

(54) METHOD AND APPARATUS FOR BANDWIDTH PART SWITCH OPERATIONS IN MOBILE COMMUNICATIONS

(71) Applicant: MediaTek Singapore Pte. Ltd., Singapore (SG)

(72) Inventors: Abdellatif Salah, Cambridge (GB); Mohammed S Aleabe Al-Imari, Cambridge (GB); Ahmet Umut Ugurlu, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 27 days.

(21) Appl. No.: 16/272,541

(22) Filed: Feb. 11, 2019

(65) Prior Publication Data

US 2019/0254056 A1 Aug. 15, 2019

Related U.S. Application Data

(60) Provisional application No. 62/629,738, filed on Feb. 13, 2018.

(51) Int. Cl.
*H04W 72/12* (2009.01)
*H04W 72/04* (2009.01)
*H04L 5/00* (2006.01)

(52) U.S. Cl.
CPC ....... *H04W 72/1289* (2013.01); *H04L 5/0053* (2013.01); *H04W 72/042* (2013.01); *H04W 72/0446* (2013.01); *H04W 72/1263* (2013.01)

(58) Field of Classification Search
CPC .............. H04L 5/0053; H04W 72/042; H04W 72/0446; H04W 72/1263; H04W 72/1289; H04W 72/14; H04W 72/04; H04W 72/12
See application file for complete search history.

(56) References Cited

U.S. PATENT DOCUMENTS

| | | | |
|---|---|---|---|
| 2015/0063259 A1 | 3/2015 | Gohari et al. | |
| 2018/0183551 A1* | 6/2018 | Chou | H04L 5/001 |
| 2018/0279358 A1* | 9/2018 | Babaei | H04W 72/0453 |
| 2019/0052432 A1* | 2/2019 | Islam | H04L 5/0053 |
| 2019/0103954 A1* | 4/2019 | Lee | H04W 76/28 |

(Continued)

FOREIGN PATENT DOCUMENTS

CN 104521306 A 4/2015

OTHER PUBLICATIONS

Lee et al. "Bandwidth Part Activation,Deactivation,and Switching in Wireless Communications", Oct. 2, 2017, Qualcomm Incorporated., U.S. Appl. No. 62/567,199, Total Pages: 48 (Year: 2017).*

(Continued)

*Primary Examiner* — Un C Cho
*Assistant Examiner* — Shah M Rahman
(74) *Attorney, Agent, or Firm* — Han IP PLLC; Andy M. Han

(57) ABSTRACT

Various solutions for bandwidth part (BWP) switch operations with respect to user equipment and network apparatus in mobile communications are described. An apparatus may receive a first downlink control information (DCI) to activate a BWP switch. The apparatus may cancel an uplink transmission or a downlink reception during a time duration. The apparatus may perform the BWP switch within the time duration.

20 Claims, 7 Drawing Sheets

(56) References Cited

U.S. PATENT DOCUMENTS

| | | | | |
|---|---|---|---|---|
| 2019/0132109 | A1* | 5/2019 | Zhou | H04W 74/0841 |
| 2019/0132845 | A1* | 5/2019 | Babaei | H04W 72/042 |
| 2019/0132857 | A1* | 5/2019 | Babaei | H04W 72/1273 |
| 2019/0149305 | A1* | 5/2019 | Zhou | H04L 5/0023 370/330 |
| 2019/0158229 | A1* | 5/2019 | Wei | H04W 76/28 |
| 2019/0166066 | A1* | 5/2019 | Ang | H04L 5/1469 |
| 2019/0166529 | A1* | 5/2019 | Chen | H04W 74/006 |
| 2019/0182870 | A1* | 6/2019 | Shih | H04W 74/004 |
| 2019/0215847 | A1* | 7/2019 | Abdoli | H04W 36/06 |
| 2019/0215870 | A1* | 7/2019 | Babaei | H04W 72/042 |
| 2019/0215900 | A1* | 7/2019 | Pan | H04W 76/38 |
| 2020/0045702 | A1* | 2/2020 | Chen | H04W 72/0453 |
| 2020/0178144 | A1* | 6/2020 | Zhou | H04L 1/1812 |
| 2020/0252917 | A1* | 8/2020 | Zhang | H04W 72/042 |
| 2020/0280970 | A1* | 9/2020 | Takeda | H04W 72/04 |
| 2020/0314820 | A1* | 10/2020 | Kim | H04W 72/1289 |

OTHER PUBLICATIONS

Ang et al. "Techniques and Apparatuses for Bandwidth Part Signaling and Switching", Nov. 24, 2017, Qualcomm Incorporated., U.S. Appl. No. 62/590,517, Total Pages: 37 (Year: 2017).*

Shih et al. "Method and apparatus of handling BWP inactivity timer during Random Access procedure in a wireless communication system", Dec. 13, 2017, ASUSTek Computer Inc., U.S. Appl. No. 62/598,078, Total Pages: 39 (Year: 2017).*

Abdoli et al. "Methods and Apparatus for Switching Between Bandwidth Parts Having Different Numerologies", Jan. 11, 2018, Huawei Technologies Co., Ltd., U.S. Appl. No. 62/616,118, Total Pages: 36 (Year: 2018).*

Chen et al. "Random Access Procedure in BWP Switch Operation", Nov. 24, 2017, FG Innovation IP Company Limited, U.S. Appl. No. 62/590,381, Total Pages: 16 (Year: 2017).*

China National Intellectual Property Administration, International Search Report and Written Opinion for International Patent Application No. PCT/CN2019/074940, dated Apr. 30, 2019.

Huawei et al., Scheduling and resource allocation mechanism for active bandwidth parts, 3GPP TSG RAN WG1 NR Ad Hoc Meeting, Qingdao, China, Jun. 27-30, 2017.

Samsung, Wider Bandwidth Operations, 3GPP TSG RAN WG1 NR Meeting #90, Prague, Czech Republic, Aug. 21-26, 2017.

Samsung, List of open issues on NR MAC, 3GPP TSG-RAN WG2 NR Ad Hoc, Vancouver, Canada, Jan. 22-26, 2018.

Taiwan Intellectual Property Office, Office Action for Taiwan Patent Application No. 108104763, dated Mar. 4, 2020.

OPPO, Timer based BWP switching, 3GPP TSG RAN WG2 #99-Bis, R2-1710126, Prague, Czech Republic, Oct. 9-13, 2017.

OPPO, SPS operations for BWP switching, 3GPP TSG RAN WG2 #99-Bis, R2-1710134, Prague, Czech Republic, Oct. 9-13, 2017.

ZTE Corporation, Consideration on the autonomous BWP switch, 3GPP TSG-RAN WG2 Meeting #100, R2-1712433, Reno, USA, Nov. 27-Dec. 1, 2017.

Samsung, Issues on Timer-based BWP switching, 3GPP TSG-RAN WG2 NR #100 Meeting, R2-1713867, Reno, USA, Nov. 27-Dec. 1, 2017.

* cited by examiner

METHOD AND APPARATUS FOR BANDWIDTH PART SWITCH OPERATIONS IN MOBILE COMMUNICATIONS

CROSS REFERENCE TO RELATED PATENT APPLICATION(S)

The present disclosure is part of a non-provisional application claiming the priority benefit of U.S. Patent Application No. 62/629,738, filed on 13 Feb. 2018, the content of which is incorporated by reference in its entirety.

TECHNICAL FIELD

The present disclosure is generally related to mobile communications and, more particularly, to bandwidth part (BWP) switch operations with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), carrier bandwidth part is introduced for resource allocation in view of the wide frequency spectrum and the wide bandwidth. A carrier bandwidth part may be defined as a contiguous set of physical resource blocks. A user equipment (UE) may be configured with multiple BWP (e.g., 4 BWP) for performing uplink transmissions or downlink receptions. Only one BWP may be activated at a given time. Some mechanisms may be used to select a specific BWP as the active one (e.g., BWP selection or BWP switching). For example, the network node may use radio resource control (RRC) signaling or downlink control information (DCI) to configure/indicate a selected BWP.

Different BWP may correspond to different configurations. For example, the configurations may comprise BWP centre frequency, subcarrier spacing (SCS), bandwidth or other numerologies. When a new BWP is activated by a BWP index signalled in the DCI, the UE may need to start preparing for the BWP switch by re-calibrating its radio frequency (RF) chain for a different BWP (e.g., different BWP centre frequency, larger or smaller BWP size, different SCS, etc.). Accordingly, a BWP switch delay may be required for the UE to fulfil the BWP switch procedures.

The UE may know when it should start transmitting or receiving on the new BWP through a slot number indication (e.g., K0 or K2) signalled in the same DCI activating the BWP switch. However, it is unclear whether the UE can still transmit or receive any data or control signals after receiving the DCI triggering the BWP switch. The uplink signal transmission and the downlink signal reception may be affected or interrupted due to the BWP switch procedures.

Accordingly, how to perform the uplink signal transmission and the downlink signal reception when the BWP switch is configured may become important in the newly developed communication systems. Therefore, it is needed to provide proper BWP switch operations to avoid transmission errors or transmission interruptions caused by the BWP switch.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to BWP switch operations with respect to user equipment and network apparatus in mobile communications.

In one aspect, a method may involve an apparatus receiving a first DCI to activate a BWP switch. The method may also involve the apparatus cancelling an uplink transmission or a downlink reception during a time duration. The method may further involve the apparatus performing the BWP switch within the time duration.

In one aspect, an apparatus may comprise a transceiver capable of wirelessly communicating with a network node of a wireless network. The apparatus may also comprise a processor communicatively coupled to the transceiver. The processor may be capable of receiving a first DCI to activate a BWP switch. The processor may also be capable of cancelling an uplink transmission or a downlink reception during a time duration. The processor may further be capable of performing the BWP switch within the time duration.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Figure 1:
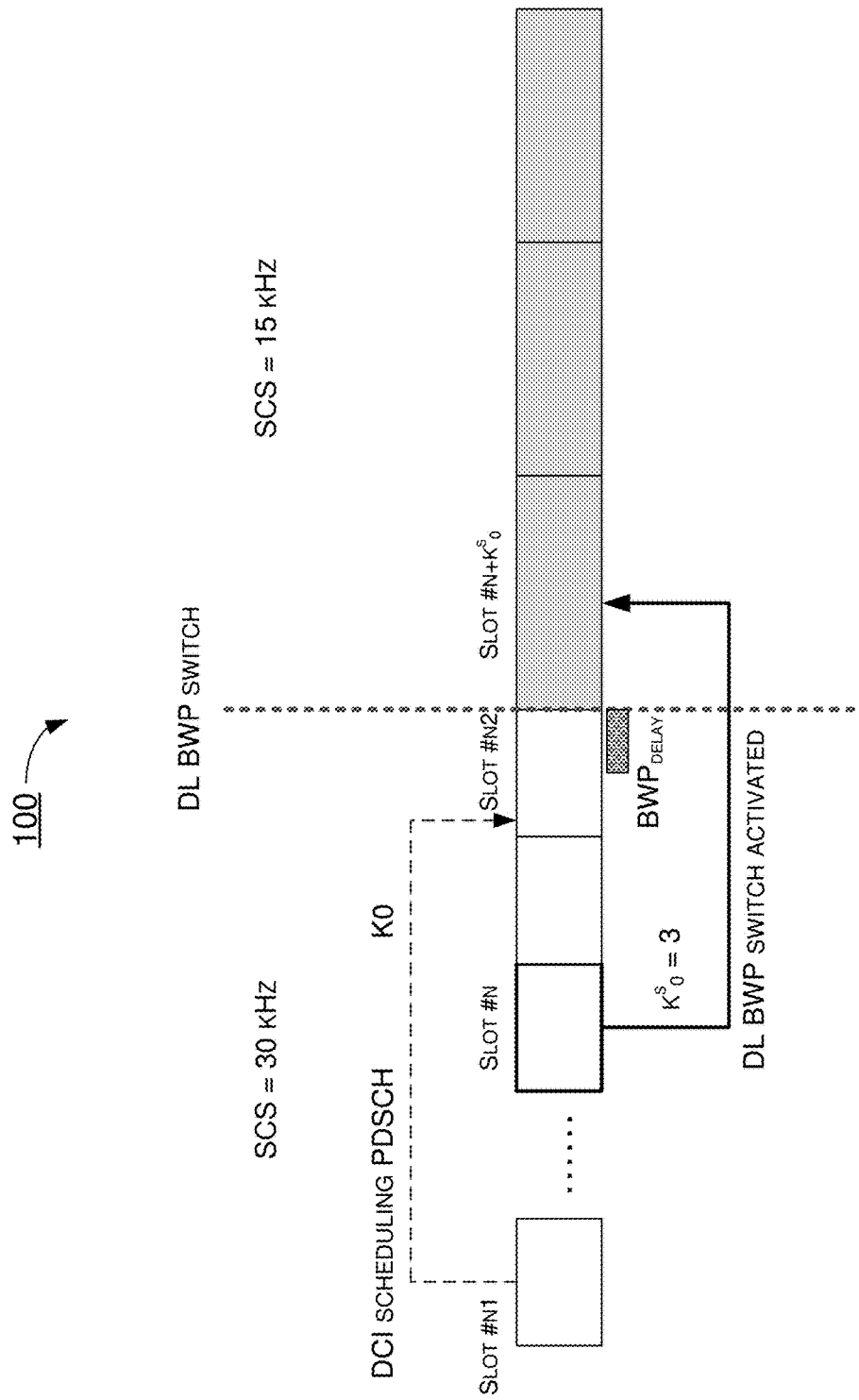
FIG. 1 is a diagram depicting an example scenario under schemes in accordance with implementations of the present disclosure.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to BWP switch operations with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, carrier bandwidth part is introduced for resource allocation in view of the wide frequency spectrum and the wide bandwidth. A carrier bandwidth part may be defined as a contiguous set of physical resource blocks. A UE may be configured with multiple BWP (e.g., 4 BWP) for performing uplink transmissions or downlink receptions. Only one BWP may be activated at a given time. Some mechanisms may be used to select a specific BWP as the active one (e.g., BWP selection or BWP switching). For example, the network node may use RRC signaling or DCI to configure/indicate a selected BWP.

Different BWP may correspond to different configurations. For example, the configurations may comprise BWP centre frequency, SCS, bandwidth or other numerologies. When a new BWP is activated by a BWP index signalled in the DCI, the UE may need to start preparing for the BWP switch by re-calibrating its radio RF chain for a different BWP (e.g., different BWP centre frequency, larger or smaller BWP size, different SCS, etc.). For example, the UE may need to retune the local oscillator, reconfigure the RF chain for a shorter/longer bandwidth, reconfigure the RF chain for a given SCS, reconfigure antenna beam, or any combination thereof. Accordingly, a BWP switch delay may be required for the UE to fulfil the BWP switch procedures.

The UE may know when it should start transmitting or receiving on the new BWP through a slot number indication (e.g., K0 or K2) signalled in the same DCI activating the BWP switch. However, it is unclear whether the UE can still transmit or receive any data or control signals between the DCI triggering the BWP switch and when the new BWP is effectively activated. The uplink signal transmission and the downlink signal reception may be affected or interrupted due to the BWP switch procedures.

In view of the above, the present disclosure proposes a number of schemes regarding BWP switch operations with respect to the UE and the network apparatus. According to the schemes of the present disclosure, the UE may be configured to determine whether to perform the uplink signal transmission or the downlink signal reception when the BWP switch is configured. The UE may be able to switch from an old BWP to a new BWP without transmission/processing errors or interrupting the uplink signal transmission and the downlink signal reception.

FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may receive a first DCI in slot #n. The first DCI may be used to configure the UE to activate/trigger a BWP switch. The first DCI may further comprise a slot number indication (e.g., $k_0^s$=3). $k_0^s$ may be the number of slots signaled in the time domain resource allocation field of the first DCI triggering the BWP switch. It informs the UE that the BWP switch should be effective in slot #n+$k_0^s$. The SCS before the BWP switch may be 30 kHz. The SCS after the BWP switch may be 15 kHz. Accordingly, the UE may be configured to perform the BWP switch in the slot before slot #n+$k_0^s$ (e.g., slot #n2). The UE should finish the BWP switch in slot #n2 and effective the new BWP in slot #n+$k_0^s$. The UE may need a time duration (e.g., $BWP_{delay}$) to perform the BWP switch.

When the BWP switch is configured, in an even that an ongoing downlink transmission is scheduled, the downlink transmission (e.g., DCI transmission or physical downlink shared channel (PDSCH) transmission) may be impacted by the BWP switch. For example, the UE may receive a second DCI in slot #n1 (e.g., n1<n). The second DCI may comprise a slot number indication (e.g., K0). It may inform the UE that a PDSCH is scheduled in another slot (e.g., slot #n2). However, the slot scheduled with the PDSCH (e.g., slot #n2) may be located between the slot receiving the first DCI (e.g., slot #n) and the slot starting with the new BWP (e.g., #n+$k_0^s$) such that n<n2<n+$k_0^s$. For example, the second DCI may schedule the PDSCH in the slot performing the BWP switch (e.g., slot #n2). Under such scenario, the PDSCH transmission will be impacted since the PDSCH transmission is overlapped with the time duration of the BWP switch. For example, the RF chain of the UE may be operated for changing to the new BWP and may not be able to receive the PDSCH transmission.

Figure 2:
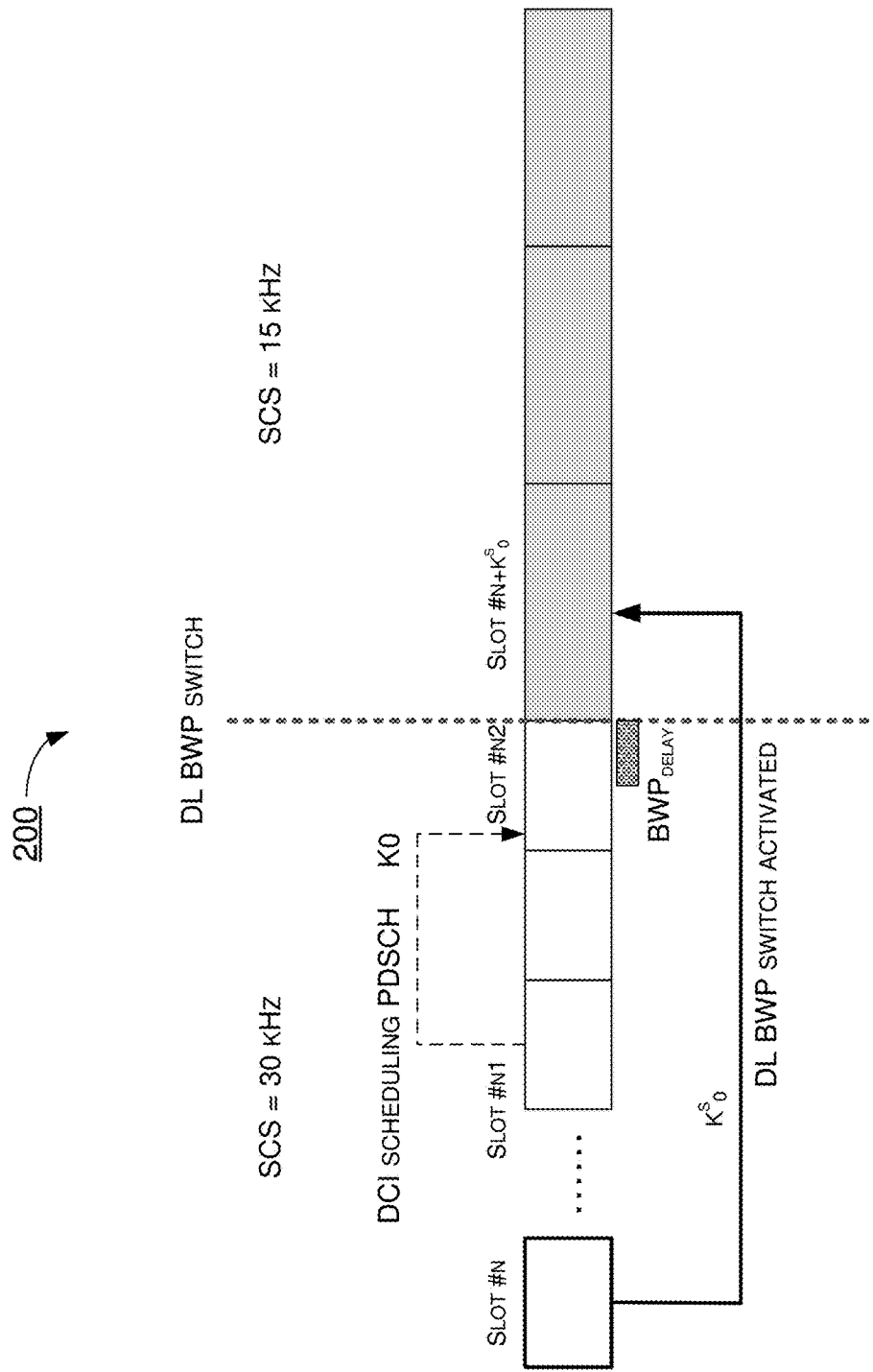
FIG. 2 is a diagram depicting an example scenario under schemes in accordance with implementations of the present disclosure.

FIG. 2 illustrates an example scenario 200 under schemes in accordance with implementations of the present disclosure. Scenario 200 involves a UE and a network node, which may be a part of a wireless communication network (e.g., an LTE network, an LTE-Advanced network, an LTE-Advanced Pro network, a 5G network, an NR network, an IoT network or an NB-IoT network). FIG. 2 illustrates another scenario that a DCI received after the DCI triggering the BWP switch may schedule a downlink transmission overlapped with the BWP switch. Specifically, the UE may receive a first DCI in slot #n. The first DCI may be used to configure the UE to activate/trigger a BWP switch. The first DCI may further comprise a slot number indication (e.g., $k_0^s$). It informs the UE that the BWP switch should be effective in slot #n+$k_0^s$. Accordingly, the UE may be configured to perform the BWP switch in the slot before the slot n+$k_0^s$ (e.g., slot #n2). The UE should finish the BWP switch in slot #n2 and effective the new BWP in slot #n+$k_0^s$. The UE may need a time duration (e.g., $BWP_{delay}$) to perform the BWP switch.

The UE may receive a second DCI in slot #n1 (e.g., n<n1). The second DCI may comprise a slot number indication (e.g., K0). It may inform the UE that a PDSCH is scheduled in another slot (e.g., slot #n2). However, the slot scheduled with the PDSCH (e.g., slot #n2) may be located between the slot receiving the first DCI (e.g., slot #n) and the slot starting with the new BWP (e.g., #n+$k_0^s$) such that n<n2<n+$k_0^s$. For example, the second DCI may schedule the PDSCH in the slot performing the BWP switch (e.g., slot #n2). Under such scenario, the PDSCH transmission will be impacted since the PDSCH transmission is overlapped with the time duration of the BWP switch. For example, the RF chain of the UE may be operated for changing to the new BWP and may not be able to receive the PDSCH transmission.

In view of the above scenarios, the present disclosure proposes a number of schemes regarding whether the UE should perform uplink transmissions and downlink receptions. Specifically, when the BWP switch configured by the first DCI is a downlink (DL) BWP switch, the UE may still be able to perform uplink transmissions without any interruption since it is not impacted by the DL BWP switch (e.g., assuming that the uplink (UL) BWP is not currently being configured). The UE may be configured to keep transmitting service request (SR), acknowledgement/negative acknowledgement (ACK/NACK) for PDSCH, uplink data (e.g., physical uplink shared channel (PUSCH)) or any other control information (e.g., physical uplink control channel (PUCCH)). Accordingly, the UE may be able to perform uplink transmissions after receiving the DCI triggering the DL BWP switch.

For downlink receptions, after receiving the first DCI triggering the BWP switch, the UE may be configured to cancel downlink receptions during the time duration for performing the BWP switch (e.g., $BWP_{delay}$) since downlink receptions may be impacted by the BWP switch. The UE may be configured not to receive the DCI, the PDSCH, the physical downlink control channel (PDCCH) or any other downlink signals. No reception may be allowed during the BWP switch delay. The UE may perform the BWP switch within the time duration.

In some implementations, the BWP switch delay may be rounded up to symbol in an event that it is defined in absolute time unit (e.g., millisecond, microsecond, etc.). Thus, no downlink reception is allowed for any slot #n' such that n'∈[n+$k_0^s$−⌈$BWP_{delay}$⌉$^{symbol}$, n+$k_0^s$]. ⌈ ⌉$^{symbol}$ may denote rounded up to symbols. For example, no downlink reception is allowed in slot #n2.

In some implementations, the UE may be configured to perform some downlink receptions between receiving the first DCI and performing the BWP switch (e.g., after receiving the first DCI and before performing the BWP switch). For example, the UE may be configured to cancel the DCI reception between receiving the first DCI and performing the BWP switch. The UE may be configured not to receive the DCI or not to process the received DCI between receiving the first DCI and performing the BWP switch. However, the UE may be configured to receive the previously scheduled data between receiving the first DCI and performing the BWP switch in an event that the data can be received before performing the BWP switch. Otherwise, the UE may be configured to drop the received PDSCH.

In some implementations, the UE may be configured to receive the scheduling DCI between receiving the first DCI and performing the BWP switch. In an event that the scheduling DCI is for the new BWP, the DCI size may be based on the new BWP configurations. Alternatively, in an event that the scheduling DCI can be for the current BWP and the new BWP, the DCI size may be based on the current BWP configurations.

In some implementations, the UE may be configured to cancel the uplink transmission or the downlink reception between receiving the first DCI and performing the BWP switch. The UE may be configured not to transmit the physical uplink control channel (PUCCH), the PUSCH, the ACK/NACK or any other downlink signals. The UE may also be configured not to receive the DCI, the PDCCH, the PDSCH or any other downlink signals. No transmission and reception may be allowed between receiving the first DCI and performing the BWP switch.

Figure 3:
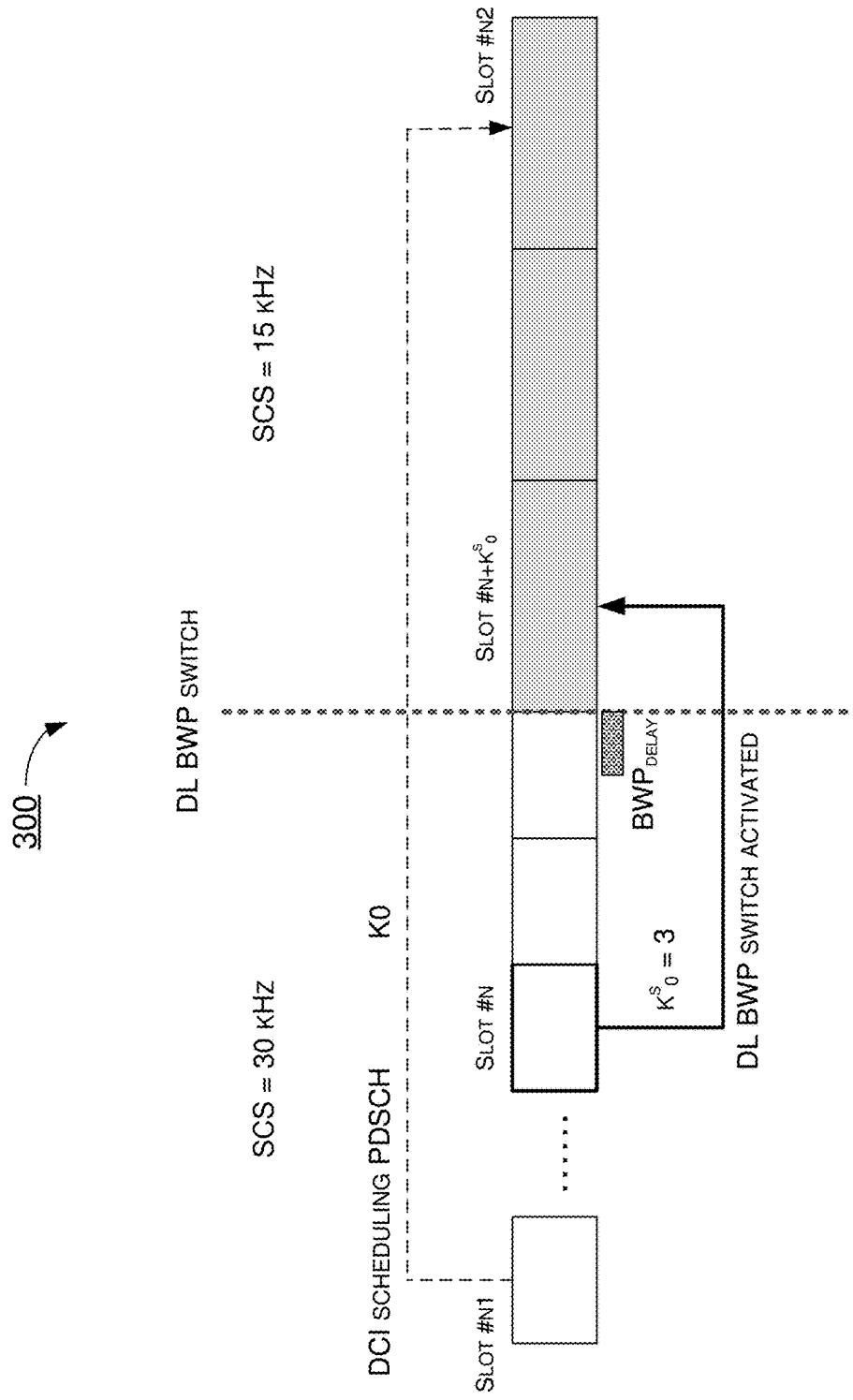
FIG. 3 is a diagram depicting an example scenario under schemes in accordance with implementations of the present disclosure.

FIG. 3 illustrates an example scenario 300 under schemes in accordance with implementations of the present disclosure. Scenario 300 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may receive a first DCI in slot #n. The first DCI may be used to configure the UE to activate/trigger a BWP switch. The first DCI may further comprise a slot number indication (e.g., $k_0^s$=3). It informs the UE that the BWP switch should be effective in slot #n+$k_0^s$. Accordingly, the UE may be configured to perform the BWP switch in the slot before slot #n+$k_0^s$. The UE should finish the BWP switch before slot #n+$k_0^s$ and effective the new BWP in slot #n+$k_0^s$. The UE may need a time duration (e.g., $BWP_{delay}$) to perform the BWP switch.

The UE may receive a second DCI in slot #n1 (e.g., n1<n). The second DCI may comprise a slot number indication (e.g., K0). It may inform the UE that a PDSCH is scheduled in another slot (e.g., slot #n2). Slot #n2 may be a slot after the BWP switch such that n2>n+$k_0^s$. In response to such scenario, the UE may be configured to discard or ignore the second DCI. The UE may be configured not to receive the scheduled PDSCH in slot #n2. Alternatively, the UE may be configured to translate the second DCI based on the new BWP configurations. The UE may be configured to receive the scheduled PDSCH in slot #n2 according to the new BWP configurations.

Figure 4:
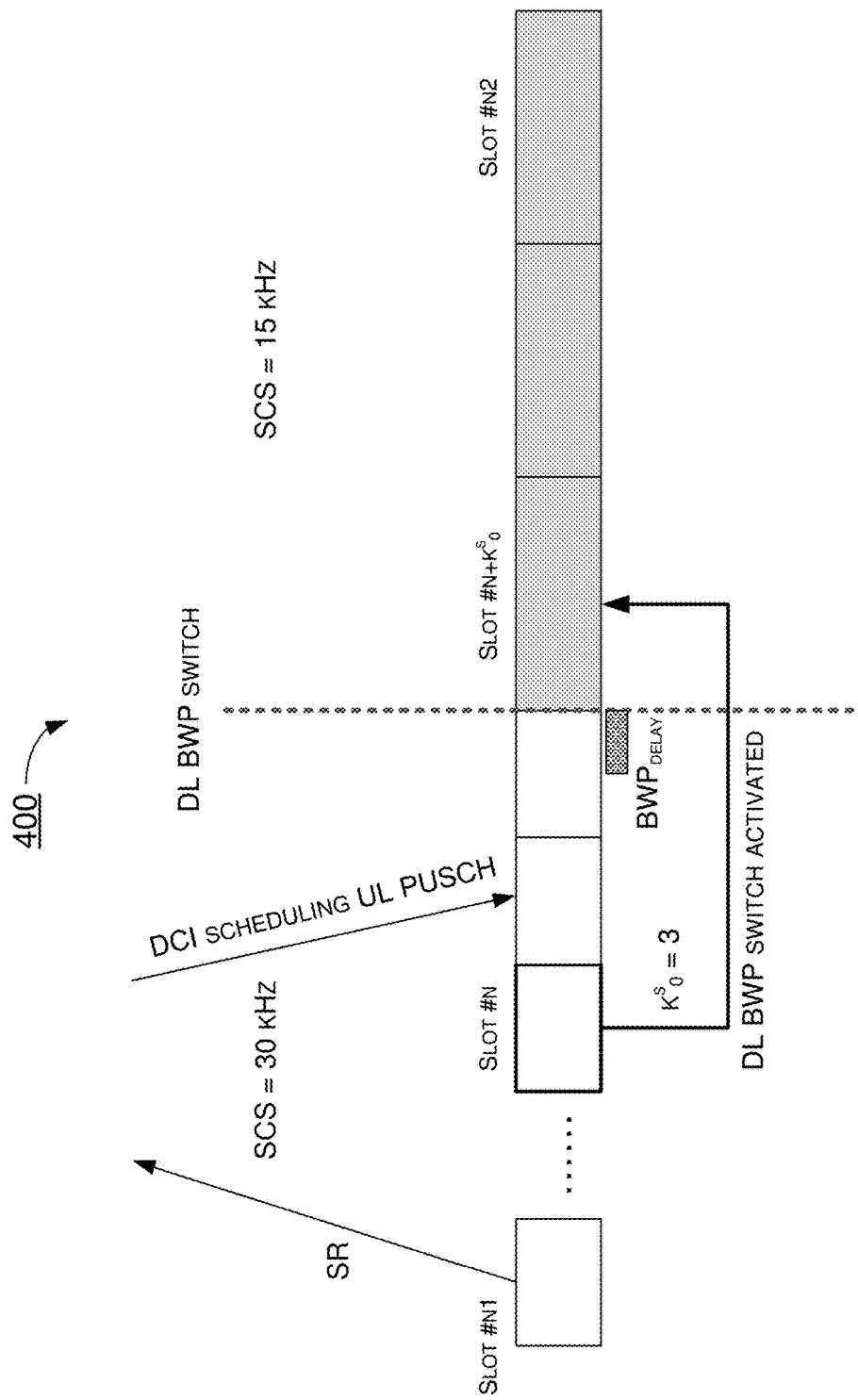
FIG. 4 is a diagram depicting an example scenario under schemes in accordance with implementations of the present disclosure.

FIG. 4 illustrates an example scenario 400 under schemes in accordance with implementations of the present disclosure. Scenario 400 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may receive a first DCI in slot #n. The first DCI may be used to configure the UE to activate/trigger a BWP switch. The first DCI may further comprise a slot number indication (e.g., $k_0^s$=3). It informs the UE that the BWP switch should be effective in slot #n+$k_0^s$. Accordingly, the UE may be configured to perform the BWP switch in the slot before slot #n+$k_0^s$. The UE should finish the BWP switch before slot #n+$k_0^s$ and effective the new BWP in slot #n+$k_0^s$. The UE may need a time duration (e.g., $BWP_{delay}$) to perform the BWP switch.

The UE may transmit an SR to the network node before the first DCI triggering the BWP switch (e.g., slot #n). In response to the SR, the network node may transmit a DCI scheduling the UL PUSCH to the UE. The DCI scheduling the UL PUSCH may arrive after receiving the first DCI triggering the BWP switch. In response to such scenario, the UE may be configured to cancel the scheduling DCI reception between receiving the first DCI and performing the BWP switch. The UE may be configured not to receive or process the scheduling DCI between receiving the first DCI and performing the BWP switch. Alternatively, the UE may be configured to receive or process the scheduling DCI between receiving the first DCI and performing the BWP switch in an event that the DCI can be received before performing the BWP switch.

Figure 5:
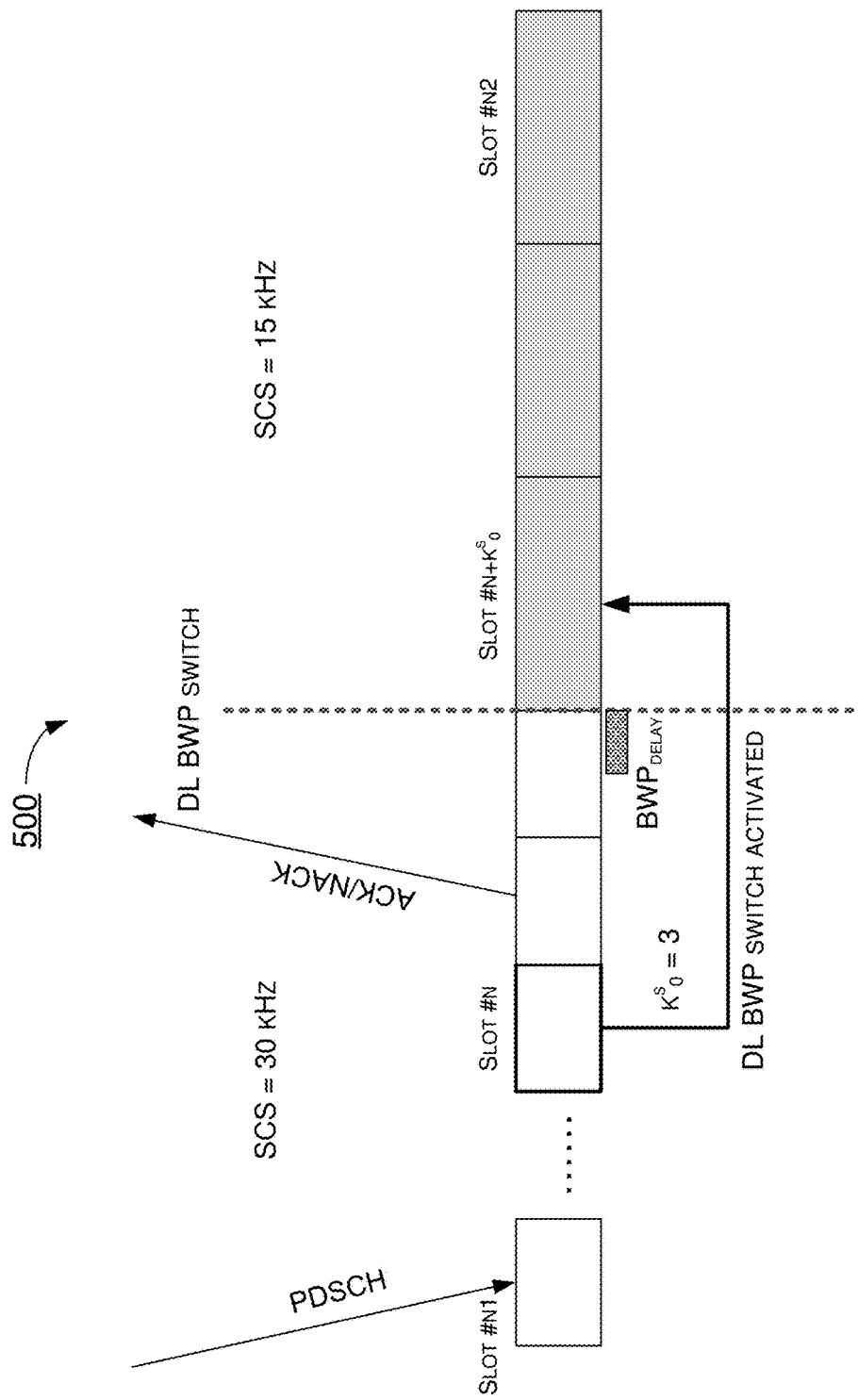
FIG. 5 is a diagram depicting an example scenario under schemes in accordance with implementations of the present disclosure.

FIG. 5 illustrates an example scenario 500 under schemes in accordance with implementations of the present disclosure. Scenario 500 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may receive a first DCI in slot #n. The first DCI may be used to configure the UE to activate/trigger a BWP switch. The first DCI may further comprise a slot number indication (e.g., $k_0^s=3$). It informs the UE that the BWP switch should be effective in slot #n+$k_0^s$. Accordingly, the UE may be configured to perform the BWP switch in the slot before slot #n+$k_0^s$. The UE should finish the BWP switch before slot #n+$k_0^s$ and effective the new BWP in slot #n+$k_0^s$. The UE may need a time duration (e.g., $BWP_{delay}$) to perform the BWP switch.

The UE may receive the PDSCH before the first DCI triggering the BWP switch (e.g., slot #n). The UE may need to transmit the ACK/NACK feedback in respond to receiving the PDSCH. The timing for transmitting the ACK/NACK feedback may be located between receiving the first DCI and performing the BWP switch. In response to such scenario, the UE may be configured to cancel the ACK/NACK transmission between receiving the first DCI and performing the BWP switch. The UE may be configured not to transmit the ACK/NACK to the network node between receiving the first DCI and performing the BWP switch. Alternatively, the UE may be configured to transmit the ACK/NACK feedback between receiving the first DCI and performing the BWP switch in an event that the ACK/NACK feedback can be transmitted before performing the BWP switch.

In some implementations, the UE may be configured to transmit an SR or a PUSCH. The SR or the PUSCH transmission may be located between receiving the first DCI and performing the BWP switch. In response to such scenario, the UE may be configured to cancel such uplink transmission between receiving the first DCI and performing the BWP switch. The UE may be configured not to transmit the SR or the PUSCH between receiving the first DCI and performing the BWP switch. The UE may be configured to postpone the uplink signal transmission to the new BWP. The UE may transmit the SR or the PUSCH after the BWP switch. Alternatively, the UE may be configured to transmit the SR or the PUSCH between receiving the first DCI and performing the BWP switch in an event that the SR or the PUSCH can be transmitted before performing the BWP switch.

In some implementations, the time duration required for performing the BWP switch (e.g., $BWP_{delay}$) may be variant depending on the UE's capability. For example, the RF chain or the hardware/software of different UEs may be different and may lead to different BWP switch delay capabilities. The network node may not know the capability of each UE. Accordingly, the UE may need to report its capability timing on a BWP switch operation to the network node. The UE may be configured to report the BWP switch delay to the network node. The reported capability may be either in absolute timing or in terms of symbols. The capability timing in terms of symbols may be interpreted based on the current BWP wherein the DCI triggering the BWP switch is detected. The UE capability timing may be defined and reported to the network node. The UE may report its capability during network registration period. The BWP delay parameter may be defined by the network as the reported UE capability.

Illustrative Implementations

Figure 6:
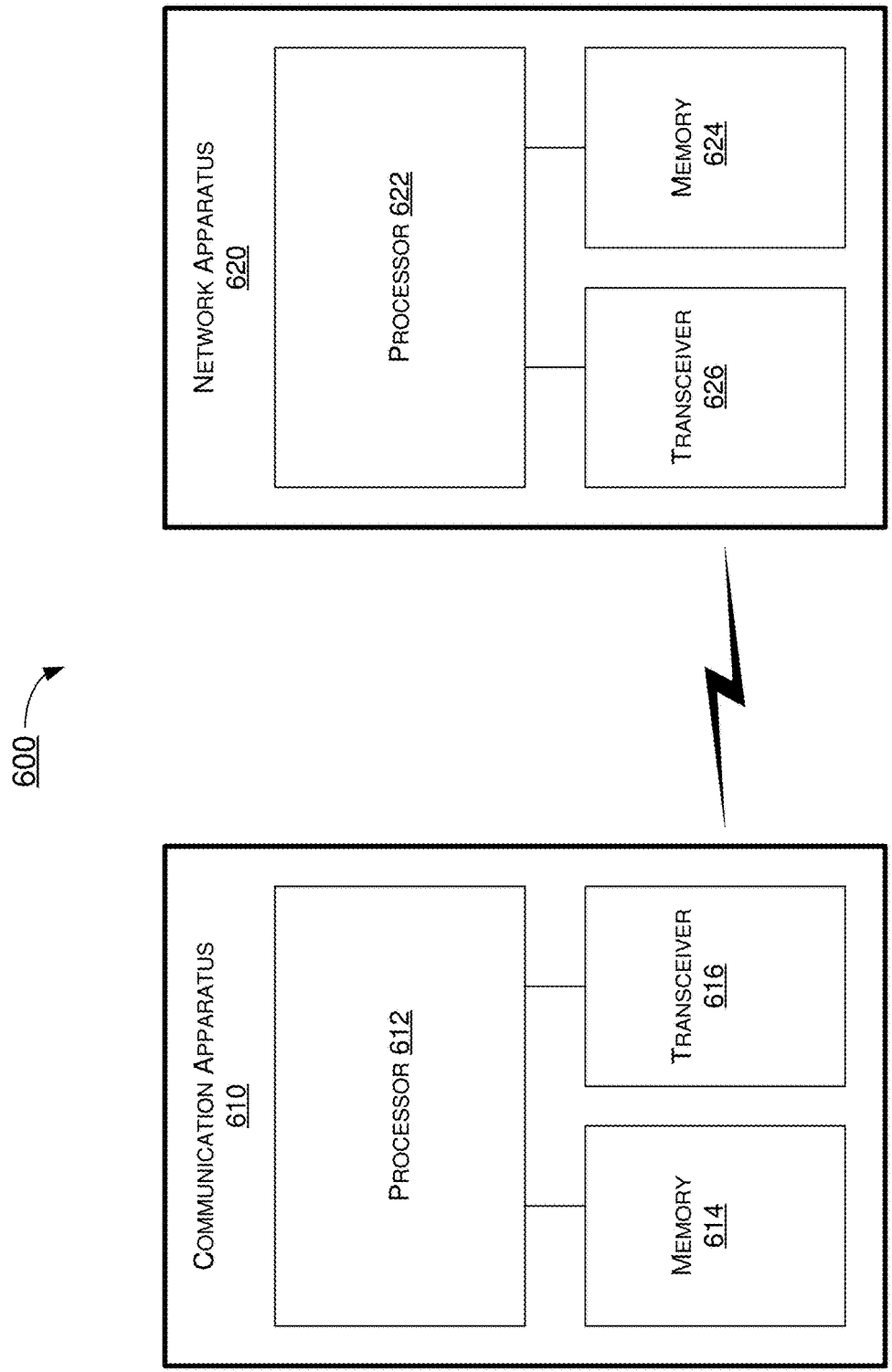
FIG. 6 is a block diagram of an example communication apparatus and an example network apparatus in accordance with an implementation of the present disclosure.

FIG. 6 illustrates an example communication apparatus 610 and an example network apparatus 620 in accordance with an implementation of the present disclosure. Each of communication apparatus 610 and network apparatus 620 may perform various functions to implement schemes, techniques, processes and methods described herein pertaining to BWP switch operations with respect to user equipment and network apparatus in wireless communications, including scenarios 100, 200, 300, 400 and 500 described above as well as process 700 described below.

Communication apparatus 610 may be a part of an electronic apparatus, which may be a UE such as a portable or mobile apparatus, a wearable apparatus, a wireless communication apparatus or a computing apparatus. For instance, communication apparatus 610 may be implemented in a smartphone, a smartwatch, a personal digital assistant, a digital camera, or a computing equipment such as a tablet computer, a laptop computer or a notebook computer. Communication apparatus 610 may also be a part of a machine type apparatus, which may be an IoT or NB-IoT apparatus such as an immobile or a stationary apparatus, a home apparatus, a wire communication apparatus or a computing apparatus. For instance, communication apparatus 610 may be implemented in a smart thermostat, a smart fridge, a smart door lock, a wireless speaker or a home control center. Alternatively, communication apparatus 610 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 610 may include at least some of those components shown in FIG. 6 such as a processor 612, for example. Communication apparatus 610 may further include one or more other components not pertinent to the proposed scheme of the present disclosure (e.g., internal power supply, display device and/or user interface device), and, thus, such component(s) of communication apparatus 610 are neither shown in FIG. 6 nor described below in the interest of simplicity and brevity.

Network apparatus 620 may be a part of an electronic apparatus, which may be a network node such as a base station, a small cell, a router or a gateway. For instance, network apparatus 620 may be implemented in an eNodeB in an LTE, LTE-Advanced or LTE-Advanced Pro network or in a gNB in a 5G, NR, IoT or NB-IoT network. Alternatively, network apparatus 620 may be implemented in the form of one or more IC chips such as, for example and without limitation, one or more single-core processors, one or more multi-core processors, or one or more RISC or CISC processors. Network apparatus 620 may include at least some of those components shown in FIG. 6 such as a processor 622, for example. Network apparatus 620 may further include one or more other components not pertinent to the proposed scheme of the present disclosure (e.g., internal power supply, display device and/or user interface device), and, thus, such component(s) of network apparatus 620 are neither shown in FIG. 6 nor described below in the interest of simplicity and brevity.

In one aspect, each of processor 612 and processor 622 may be implemented in the form of one or more single-core processors, one or more multi-core processors, or one or more RISC or CISC processors. That is, even though a singular term "a processor" is used herein to refer to processor 612 and processor 622, each of processor 612 and processor 622 may include multiple processors in some implementations and a single processor in other implementations in accordance with the present disclosure. In another aspect, each of processor 612 and processor 622 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 612 and processor 622 is a special-purpose machine specifically designed, arranged and configured to perform specific tasks including power consumption reduction in a device (e.g., as represented by communication apparatus 610) and a network (e.g., as represented by network apparatus 620) in accordance with various implementations of the present disclosure.

In some implementations, communication apparatus 610 may also include a transceiver 616 coupled to processor 612 and capable of wirelessly transmitting and receiving data. In some implementations, communication apparatus 610 may further include a memory 614 coupled to processor 612 and capable of being accessed by processor 612 and storing data therein. In some implementations, network apparatus 620 may also include a transceiver 626 coupled to processor 622 and capable of wirelessly transmitting and receiving data. In some implementations, network apparatus 620 may further include a memory 624 coupled to processor 622 and capable of being accessed by processor 622 and storing data therein. Accordingly, communication apparatus 610 and network apparatus 620 may wirelessly communicate with each other via transceiver 616 and transceiver 626, respectively. To aid better understanding, the following description of the operations, functionalities and capabilities of each of communication apparatus 610 and network apparatus 620 is provided in the context of a mobile communication environment in which communication apparatus 610 is implemented in or as a communication apparatus or a UE and network apparatus 620 is implemented in or as a network node of a communication network.

In some implementations, processor 612 may receive, via transceiver 616, a first DCI triggering a BWP switch in slot #n. The first DCI may comprise a slot number indication (e.g., $k_0^s$). It informs communication apparatus 610 that the BWP switch should be effective in slot #n+$k_0^s$. Accordingly, processor 612 may be configured to perform the BWP switch in the slot before slot #n+$k_0^s$. Processor 612 should finish the BWP switch before slot #n+$k_0^s$ and effective the new BWP in slot #n+$k_0^s$. Processor 612 may need a time duration (e.g., $BWP_{delay}$) to perform the BWP switch. When the BWP switch is configured, in an even that an ongoing downlink transmission is scheduled, the downlink transmission (e.g., DCI transmission or PDSCH transmission) may be impacted by the BWP switch. For example, processor 612 may receive, via transceiver 616, a second DCI in slot #n1. Processor 612 may receive the second DCI before or after the first DCI. The second DCI may comprise a slot number indication (e.g., K0). It may inform communication apparatus 610 that a PDSCH is scheduled in another slot (e.g., slot #n2). However, the slot scheduled with the PDSCH (e.g., slot #n2) may be located between the slot receiving the first DCI (e.g., slot #n) and the slot starting with the new BWP (e.g., #n+$k_0^s$) such that n<n2<n+$k_0^s$. For example, the second DCI may schedule the PDSCH in the slot performing the BWP switch (e.g., slot #n2). Under such scenario, the PDSCH transmission will be impacted since the PDSCH transmission is overlapped with the time duration of the BWP switch. For example, the RF chain of transceiver 616 may be operated for changing to the new BWP and may not be able to receive the PDSCH transmission.

In some implementations, in an event that the BWP switch configured by the first DCI is a DL BWP switch, processor 612 may be configured to perform, via transceiver 616, uplink transmissions without any interruption since it is not impacted by the DL BWP switch (e.g., assuming that the UL BWP is not currently being configured). Processor 612 may be configured to keep transmitting SR, ACK/NACK for PDSCH, uplink data (e.g., PUSCH) or any other control information (e.g., PUCCH). Accordingly, processor 612 may be able to perform uplink transmissions after receiving the DCI triggering the DL BWP switch.

In some implementations, after receiving the first DCI triggering the BWP switch, processor 612 may be configured to cancel downlink receptions during the time duration for performing the BWP switch (e.g., $BWP_{delay}$) since downlink receptions may be impacted by the BWP switch. Processor 612 may be configured not to receive the DCI, the PDSCH, the PDCCH or any other downlink signals. No reception may be allowed during the BWP switch delay. Processor 612 may perform the BWP switch within the time duration.

In some implementations, processor 612 may be configured to perform some downlink receptions between receiving the first DCI and performing the BWP switch (e.g., after receiving the first DCI and before performing the BWP switch). For example, processor 612 may be configured to cancel the DCI reception between receiving the first DCI and performing the BWP switch. Processor 612 may be configured not to receive the DCI or not to process the received DCI between receiving the first DCI and performing the BWP switch. However, processor 612 may be configured to receive, via transceiver 616, the previously scheduled data between receiving the first DCI and performing the BWP switch in an event that the data can be received before performing the BWP switch. Otherwise, processor 612 may be configured to drop the received PDSCH.

In some implementations, processor 612 may be configured to receive, via transceiver 616, the scheduling DCI between receiving the first DCI and performing the BWP switch. In an event that the scheduling DCI is for the new BWP, the DCI size may be based on the new BWP configurations. Alternatively, in an event that the scheduling DCI can be for the current BWP and the new BWP, the DCI size may be based on the current BWP configurations.

In some implementations, processor 612 may be configured to cancel the uplink transmission or the downlink reception between receiving the first DCI and performing the BWP switch. Processor 612 may be configured not to transmit the PUCCH, the PUSCH, the ACK/NACK or any other downlink signals. Processor 612 may also be configured not to receive the DCI, the PDCCH, the PDSCH or any other downlink signals. No transmission and reception may be allowed between receiving the first DCI and performing the BWP switch.

In some implementations, processor 612 may receive, via transceiver 616, a second DCI in slot #n1 before slot #n. The second DCI may comprise a slot number indication (e.g., K0). It may inform communication apparatus 610 that a PDSCH is scheduled in another slot (e.g., slot #n2). Slot #n2 may be a slot after the BWP switch such that $n2 > n + k_0^s$. In response to such scenario, processor 612 may be configured to discard or ignore the second DCI. Processor 612 may be configured not to receive the scheduled PDSCH in slot #n2. Alternatively, processor 612 may be configured to translate the second DCI based on the new BWP configurations. Processor 612 may be configured to receive, via transceiver 616, the scheduled PDSCH in slot #n2 according to the new BWP configurations.

In some implementations, processor 612 may transmit, via transceiver 616, an SR to network apparatus 620 before the first DCI triggering the BWP switch (e.g., slot #n). In response to the SR, processor 622 may transmit, via transceiver 626, a DCI scheduling the UL PUSCH to communication apparatus 610. The DCI scheduling the UL PUSCH may arrive after receiving the first DCI triggering the BWP switch. In response to such scenario, processor 612 may be configured to cancel the scheduling DCI reception between receiving the first DCI and performing the BWP switch. Processor 612 may be configured not to receive or process the scheduling DCI between receiving the first DCI and performing the BWP switch. Alternatively, processor 612 may be configured to receive, via transceiver 616, or process the scheduling DCI between receiving the first DCI and performing the BWP switch in an event that the DCI can be received before performing the BWP switch.

In some implementations, processor 612 may receive, via transceiver 616, the PDSCH before the first DCI triggering the BWP switch (e.g., slot #n). Processor 612 may need to transmit the ACK/NACK feedback in respond to receiving the PDSCH. The timing for transmitting the ACK/NACK feedback may be located between receiving the first DCI and performing the BWP switch. In response to such scenario, processor 612 may be configured to cancel the ACK/NACK transmission between receiving the first DCI and performing the BWP switch. Processor 612 may be configured not to transmit the ACK/NACK to network apparatus 620 between receiving the first DCI and performing the BWP switch. Alternatively, processor 612 may be configured to transmit, via transceiver 616, the ACK/NACK feedback between receiving the first DCI and performing the BWP switch in an event that the ACK/NACK feedback can be transmitted before performing the BWP switch.

In some implementations, processor 612 may be configured to transmit, via transceiver 616, an SR or a PUSCH. The SR or the PUSCH transmission may be located between receiving the first DCI and performing the BWP switch. In response to such scenario, processor 612 may be configured to cancel such uplink transmission between receiving the first DCI and performing the BWP switch. Processor 612 may be configured not to transmit the SR or the PUSCH between receiving the first DCI and performing the BWP switch. Processor 612 may be configured to postpone the uplink signal transmission to the new BWP. Processor 612 may transmit, via transceiver 616, the SR or the PUSCH after the BWP switch. Alternatively, processor 612 may be configured to transmit, via transceiver 616, the SR or the PUSCH between receiving the first DCI and performing the BWP switch in an event that the SR or the PUSCH can be transmitted before performing the BWP switch.

In some implementations, the time duration required for performing the BWP switch (e.g., $BWP_{delay}$) may be variant depending on the communication apparatus capability. For example, the RF chain or the hardware/software of different communication apparatus may be different and may lead to different BWP switch delay capabilities. Network apparatus 620 may not know the capability of each communication apparatus. Accordingly, processor 612 may need to report its capability timing on a BWP switch operation to network apparatus 620. Processor 612 may be configured to report, via transceiver 616, the BWP switch delay to network apparatus 620. The reported capability may be either in absolute timing or in terms of symbols. The capability timing in terms of symbols may be interpreted based on the current BWP wherein the DCI triggering the BWP switch is detected. The capability timing may be defined and reported to network apparatus 620. Processor 612 may report its capability during network registration period. The BWP delay parameter may be defined by the network as the reported communication apparatus capability.

Illustrative Processes

Figure 7:
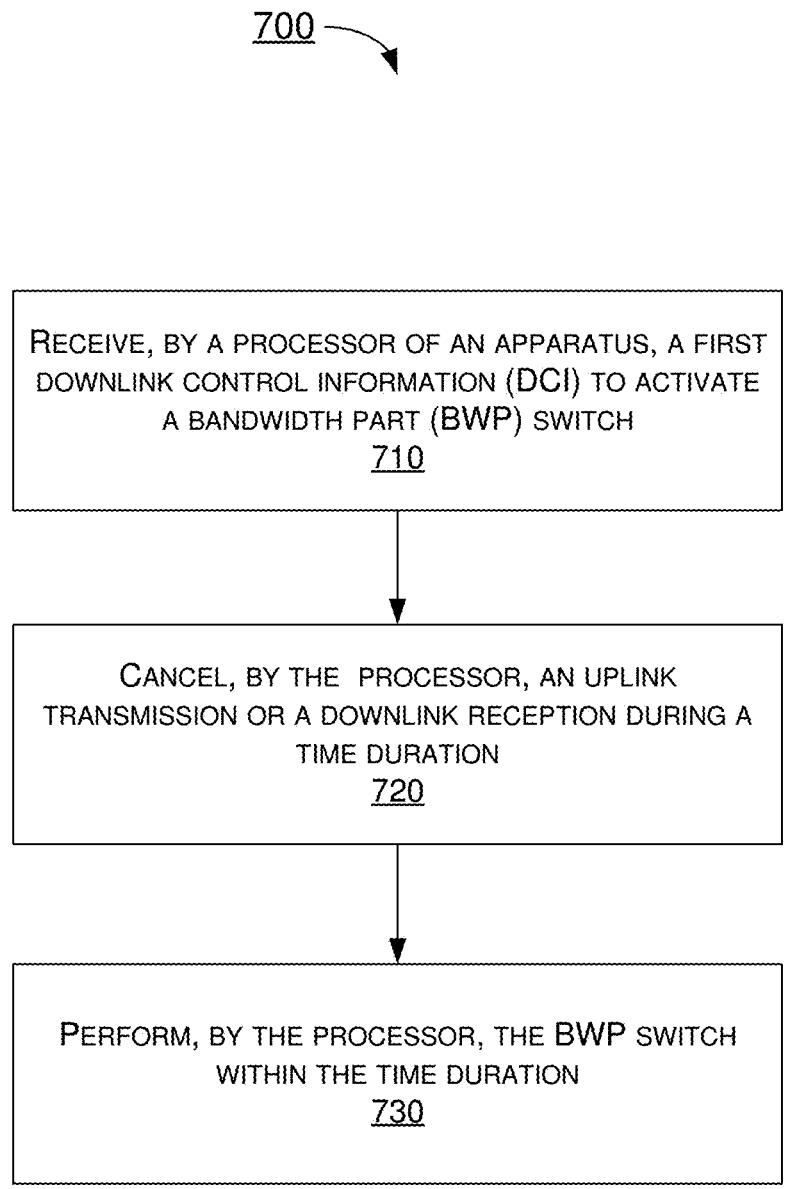
FIG. 7 is a flowchart of an example process in accordance with an implementation of the present disclosure.

FIG. 7 illustrates an example process 700 in accordance with an implementation of the present disclosure. Process 700 may be an example implementation of scenarios 100, 200, 300, 400 and 500, whether partially or completely, with respect to BWP switch operations with the present disclosure. Process 700 may represent an aspect of implementation of features of communication apparatus 610. Process 700 may include one or more operations, actions, or functions as illustrated by one or more of blocks 710, 720 and 730. Although illustrated as discrete blocks, various blocks of process 700 may be divided into additional blocks, combined into fewer blocks, or eliminated, depending on the desired implementation. Moreover, the blocks of process 700 may executed in the order shown in FIG. 7 or, alternatively, in a different order. Process 700 may be implemented by communication apparatus 610 or any suitable UE or machine type devices. Solely for illustrative purposes and without limitation, process 700 is described below in the context of communication apparatus 610. Process 700 may begin at block 710.

At 710, process 700 may involve processor 612 of apparatus 610 receiving a first DCI to activate a BWP switch. Process 700 may proceed from 710 to 720.

At 720, process 700 may involve processor 612 cancelling an uplink transmission or a downlink reception during a time duration. Process 700 may proceed from 720 to 730.

At 730, process 700 may involve processor 612 performing the BWP switch within the time duration.

In some implementations, process 700 may involve processor 612 receiving a second DCI scheduling a PDSCH in a slot performing the BWP switch. The second DCI may be received before the first DCI.

In some implementations, process 700 may involve processor 612 receiving a second DCI scheduling a PDSCH in a slot performing the BWP switch. The second DCI may be received after the first DCI.

In some implementations, process 700 may involve processor 612 cancelling the uplink transmission or the downlink reception between receiving the first DCI and performing the BWP switch.

In some implementations, process 700 may involve processor 612 performing the uplink transmission or the downlink reception between receiving the first DCI and performing the BWP switch.

In some implementations, process 700 may involve processor 612 receiving a second DCI scheduling a PDSCH in a slot after the BWP switch. Process 700 may further involve processor 612 discarding the second DCI.

In some implementations, process 700 may involve processor 612 transmitting an SR. Process 700 may further involve processor 612 cancelling a scheduling DCI reception between receiving the first DCI and performing the BWP switch. The scheduling DCI may schedule a PUSCH.

In some implementations, process 700 may involve processor 612 receiving a PDSCH before receiving the first DCI. Process 700 may further involve processor 612 cancelling an acknowledgement transmission between receiving the first DCI and performing the BWP switch.

In some implementations, process 700 may involve processor 612 cancelling the uplink transmission between receiving the first DCI and performing the BWP switch. Process 700 may further involve processor 612 postponing the uplink transmission to a new BWP.

In some implementations, process 700 may involve processor 612 reporting a BWP switch delay to a network node.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
receiving, by a processor of an apparatus, a first downlink control information (DCI) to activate a bandwidth part (BWP) switch;
cancelling, by the processor, an uplink transmission or a downlink reception that is scheduled to be performed during a first slot of a plurality of slots;
performing, by the processor, the BWP switch within the first slot during a time duration of BWP delay that is adjacent to and before a boundary with a second slot of the plurality of slots which is subsequent the first slot; and
cancelling, by the processor, a scheduling DCI reception between receiving the first DCI and performing the BWP switch,
wherein the scheduling DCI schedules a physical uplink shared channel (PUSCH).

2. The method of claim 1, further comprising:
receiving, by the processor, a second DCI scheduling a physical downlink shared channel (PDSCH) in the first slot performing the BWP switch,
wherein the second DCI is received before the first DCI.

3. The method of claim 1, further comprising:
receiving, by the processor, a second DCI scheduling a physical downlink shared channel (PDSCH) in the first slot performing the BWP switch,
wherein the second DCI is received after the first DCI.

4. The method of claim 1, further comprising:
cancelling, by the processor, the uplink transmission or the downlink reception between receiving the first DCI and performing the BWP switch.

5. The method of claim 1, further comprising:
performing, by the processor, the uplink transmission or the downlink reception between receiving the first DCI and performing the BWP switch.

6. The method of claim 1, further comprising:
receiving, by the processor, a second DCI scheduling a physical downlink shared channel (PDSCH) in a third slot of the plurality of slots after the BWP switch; and
discarding, by the processor, the second DCI.

7. The method of claim 1, further comprising:
transmitting, by the processor, a service request (SR).

8. The method of claim 1, further comprising:
receiving, by the processor, a physical downlink shared channel (PDSCH) before receiving the first DCI; and
cancelling, by the processor, an acknowledgement transmission between receiving the first DCI and performing the BWP switch.

9. The method of claim 1, further comprising:
cancelling, by the processor, the uplink transmission between receiving the first DCI and performing the BWP switch; and
postponing, by the processor, the uplink transmission to a new BWP.

10. The method of claim 1, further comprising:
reporting, by the processor, a BWP switch delay to a network node.

11. An apparatus, comprising:
a transceiver capable of wirelessly communicating with a network node of a wireless network; and
a processor communicatively coupled to the transceiver, the processor capable of:
receiving, via the transceiver, a first downlink control information (DCI) to activate a bandwidth part (BWP) switch;
cancelling an uplink transmission or a downlink reception that is scheduled to be performed during a first slot of a plurality of slots; and
performing the BWP switch within the first slot during a time duration of BWP delay that is adjacent to and before a boundary with a second slot of the plurality of slots which is subsequent the first slot; and
cancelling a scheduling DCI reception between receiving the first DCI and performing the BWP switch,
wherein the scheduling DCI schedules a physical uplink shared channel (PUSCH).

12. The apparatus of claim 11, wherein the processor is further capable of:
receiving, via the transceiver, a second DCI scheduling a physical downlink shared channel (PDSCH) in the first slot performing the BWP switch,
wherein the second DCI is received before the first DCI.

13. The apparatus of claim 11, wherein the processor is further capable of:
receiving, via the transceiver, a second DCI scheduling a physical downlink shared channel (PDSCH) in the first slot performing the BWP switch,
wherein the second DCI is received after the first DCI.

14. The apparatus of claim 11, wherein the processor is further capable of:
cancelling the uplink transmission or the downlink reception between receiving the first DCI and performing the BWP switch.

15. The apparatus of claim 11, wherein the processor is further capable of:
performing, via the transceiver, the uplink transmission or the downlink reception between receiving the first DCI and performing the BWP switch.

16. The apparatus of claim 11, wherein the processor is further capable of:
receiving, via the transceiver, a second DCI scheduling a physical downlink shared channel (PDSCH) in a third slot of the plurality of slots after the BWP switch; and
discarding the second DCI.

17. The apparatus of claim 11, wherein the processor is further capable of:
transmitting, via the transceiver, a service request (SR).

18. The apparatus of claim 11, wherein the processor is further capable of:
receiving, via the transceiver, a physical downlink shared channel (PDSCH) before receiving the first DCI; and
cancelling an acknowledgement transmission between receiving the first DCI and performing the BWP switch.

19. The apparatus of claim 11, wherein the processor is further capable of:
cancelling the uplink transmission between receiving the first DCI and performing the BWP switch; and
postponing the uplink transmission to a new BWP.

20. The apparatus of claim 11, wherein the processor is further capable of:
reporting, via the transceiver, a BWP switch delay to the network node.

* * * * *